(12) United States Patent
Kasztelan et al.

(10) Patent No.: US 6,712,953 B1
(45) Date of Patent: Mar. 30, 2004

(54) CATALYST THAT CONTAINS A ZEOLITE THAT IS HIGH IN AN ELEMENT OF GROUP VIB AND/OR VIII AND ITS USE IN HYDROREFINING AND HYDROCRACKING OF HYDROCARBON FRACTIONS

(75) Inventors: Slavik Kasztelan, Rueil Malmaison (FR); Nathalie Marchal-George, Saint Genis Laval (FR); Tivadar Cseri, Courbevoie (FR); Pierre Leyrit, Rueil Malmaison (FR); Philippe Dascotte, Saint Gratien (FR); Elisabeth Rosenberg, Rueil Malmaison (FR)

(73) Assignee: Institut Francais du Pétrole, Rueil-Malmaison (FR)

( * ) Notice: Subject to any disclaimer, the term of this patent is extended or adjusted under 35 U.S.C. 154(b) by 18 days.

(21) Appl. No.: 09/603,838

(22) Filed: Oct. 16, 2000

(30) Foreign Application Priority Data

Jun. 25, 1999 (FR) .............................................. 99 08180

(51) Int. Cl.⁷ ................................................. B01J 29/06
(52) U.S. Cl. ............................... 208/111.01; 208/111.3; 208/111.35; 502/64; 502/66; 502/74; 502/79
(58) Field of Search ............................... 502/64, 66, 74, 502/79; 208/111.01, 111.3, 111.35

(56) References Cited

U.S. PATENT DOCUMENTS 3,730,878 A    5/1973   Pollitzer
3,853,747 A   12/1974   Young
4,297,243 A   10/1981   Moorehead
4,585,748 A *  4/1986   Usui et al. ..................... 502/66
4,777,157 A * 10/1988   Koepke et al. ............. 502/202
5,393,409 A *  2/1995   Jan et al. ..................... 208/108
5,972,832 A * 10/1999   Shi et al. ..................... 502/224
6,531,051 B1 * 3/2003   Kasztelan et al. ........ 208/111.3

FOREIGN PATENT DOCUMENTS

EP          0 348 001         12/1989

* cited by examiner

Primary Examiner—M. Alexandra Elve
Assistant Examiner—Christina Ildebrando
(74) Attorney, Agent, or Firm—Millen, White, Zelano & Branigan, P.C.

(57) ABSTRACT

The invention relates to a catalyst that contains at least one matrix, at least one zeolite and at least one hydro-dehydrogenating element that is located at the matrix (deposited on the catalyst or contained in the matrix), in which the zeolite contains in its porous network at least one element of group VIB and/or group VIII. Said hydro-dehydrogenating element preferably belongs to group VIB and/or to group VIII of the periodic table. The catalyst contains at least one promoter element)phosphorus, boron, silicon). The invention also relates to the use of this catalyst for the transformation of hydrocarbon fractions, in particular hydrorefining and hydrocracking

24 Claims, 1 Drawing Sheet

Figure 1:
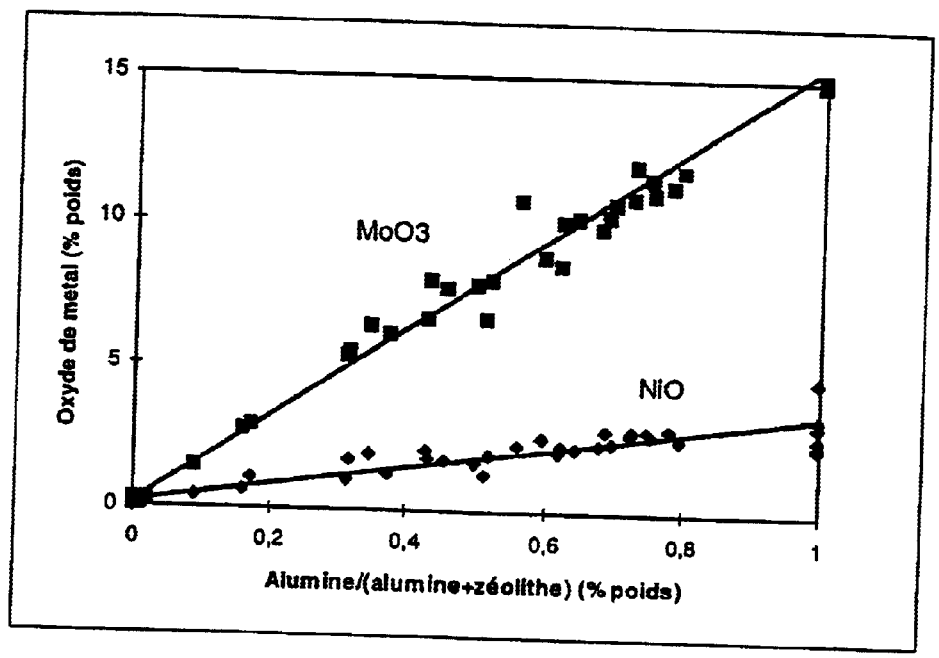

CATALYST THAT CONTAINS A ZEOLITE THAT IS HIGH IN AN ELEMENT OF GROUP VIB AND/OR VIII AND ITS USE IN HYDROREFINING AND HYDROCRACKING OF HYDROCARBON FRACTIONS

CROSS-REFERENCE TO RELATED APPLICATION

This application is related to Applicants' concurrently filed application Ser. No. 09/603,837 filed Jun. 26, 2000, entitled "CATALYST THAT CONTAINS A ZEOLITE THAT IS HIGH IN AN ELEMENT OF GROUP VB AND ITS USE IN HYDROREFINING AND HYDROCRACKING OF HYDROCARBON FRACTIONS" based on French Application 99/08.177 filed Jun. 25, 1999.

This invention relates to a catalyst that can be used for hydrorefining and hydrocracking of hydrocarbon feedstocks under hydrogen pressure, whereby said catalyst comprises at least one zeolite, preferably a Y or beta zeolite, and at least one oxide matrix, whereby the zeolite contains in its porous network at least one metal of group VIB (group 6 according to the new notation of the periodic table: Handbook of Chemistry and Physics, 76th Edition, 1995–1996), preferably molybdenum and tungsten, and/or at least one noble or non-noble metal of group VIII (groups 8, 9 and 10) of said classification, preferably cobalt, nickel and iron. The oxide matrix contains at least one hydro-dehydrogenating metal, preferably of group VIB, advantageously molybdenum and tungsten, and/or at least one metal of group VIII, advantageously cobalt, nickel and iron. At least one promoter element (phosphorus, boron, silicon) is present.

This invention also relates to the processes for preparation of said catalyst, as well as its use for the hydrocracking of hydrocarbon feedstocks, such as the petroleum fractions and the fractions that are obtained from carbon containing sulfur and nitrogen in the form of organic compounds, whereby said feedstocks optionally contain metals and/or oxygen.

Conventional hydrocracking of petroleum fractions is a very important refining process that makes it possible to produce, starting from excess heavy hydrocarbon feedstocks, lighter fractions such as gasolines, kerosenes and light gasoils that the refiner seeks to adapt his production to the structure of the demand. Relative to the catalytic cracking, the advantage of catalytic hydrocracking is to provide more selectively middle distillates, kerosenes and gasoils of very good quality.

The catalysts that are used in conventional hydrocracking are all of bifunctional type that link an acid function to a hydrogenating function. The acid function is generally provided by crystallized aluminosilicate-type substrates that are called zeolites. The hydrogenating function is provided either by one or several metals of group VIII of the periodic table, such as iron, cobalt, nickel, ruthenium, rhodium, palladium, osmium, iridium and platinum, or by a combination of at least one metal of group VI of the periodic table, such as chromium, molybdenum and tungsten, and at least one metal of group VIII, in general a non-noble metal such as Co, Ni and Fe.

The pure or dealuminified zeolite-type substrates that are, for example, of Y type or else beta type have a very strong acidity. These substrates therefore ensure the acid function of the hydrocracking catalysts. These systems are active, and the products that are formed are of good quality. The drawback of these zeolite-based catalytic systems is a degradation of the selectivity of middle distillates (gasoil+kerosene) when the amount of zeolite is increased. This therefore limits the amount of zeolite that can be used in the catalyst and therefore the level of activity that can be achieved while maintaining a good selectivity of middle distillates.

The applicant discovered that to obtain a hydrocracking catalyst that has strong activity and good selectivity of middle distillates, it is advantageous to provide a promoter element and to introduce into the porous network of the zeolite a hydrogenating phase that thus comes to reinforce the hydro-dehydrogenating phase that is present in the oxide matrix, and it is also advantageous to use a large amount of zeolite. The hydrogenating function that is introduced into the zeolite is ensured by at least one metal or metal compound of group VI and/or at least one metal or metal compound of group VIII. It is advantageously possible to use a combination of metals of group VI and/or a combination of metals of group VIII.

More specifically, the invention relates to a catalyst that contains at least one matrix, at least one zeolite and at least one hydro-dehydrogenating element that is located at the matrix (i.e., deposited on the catalyst or contained in the matrix), catalyst in which the zeolite contains in its porous network at least one element of group VIB and/or group VIII, whereby the catalyst also contains at least one promoter element that is selected from the group that is formed by boron, silicon and phosphorus.

The catalyst of this invention generally contains in % by weight relative to the total mass of the catalyst:

0.1 to 99%, or 0.1–98.7%, or else 0.1 to 95% and preferably 0.1–90% and even 0.1–85%, of at least one zeolite, preferably a Y zeolite or a beta zeolite, advantageously the zeolite content is at least 5% by weight, preferably at least 15%, and even at least 20%, 1 to 99.7%, or 1 to 98.8%, preferably 10 to 98% and even more preferably is to 95% of at least one amorphous oxide matrix, preferably an alumina, a silica or a silica-alumina, at least one of the elements of groups VIB and/or VIII at a ratio of:
  0.1 to 40%, preferably 3 to 45% and even more preferably 5 to 30% of metals of group VIB (expressed in % of oxide),
  0.1 to 30%, preferably 0.1 to 25% and even more preferably 0.1 to 20% of metals of group VIII (expressed in % of oxide), at most 20%, or else 0.1–20%, preferably 0 to 15% and even more preferably 0 to 10% (expressed in % of oxide), of at least one promoter element that is selected from the group that is formed by boron, phosphorus, silicon (not including the silicon that is contained in the zeolite), and optionally 0–20%, preferably 0.1–15%, or else 0.1–10% of at least one element that is selected from group VII A, preferably fluorine, catalyst in which the zeolite contains in its porous system at least one of the elements of groups VIB and VIII at a ratio of (in % by weight in the catalyst):

0.1 to 10%, preferably 0.1 to 5% and even more preferably 0.1 to 3% by weight of oxide of at least one metal of group VIB, 0.1 to 10%, preferably 0 to 7% and even more preferably 0 to 5% by weight of oxide of at least one metal of group VIII.

The metal of group VIB that is contained in the porous network of the zeolite can be the same or different from the one that is contained in the matrix. In the same way, the metal of group VIII that is contained in the zeolite can be the same or different from the one that is contained in the matrix.

The demonstration of the presence of the hydrogenating phase in the porous network of the zeolite can be carried out by various methods that are known to one skilled in the art such as, for example, the electronic microprobe and the electronic transmission microscopy equipped with an X energy dispersion spectrometer with a detector that allows the identification and the quantification of elements that are present in the crystals of the zeolite and in the oxide matrix.

A preferred catalyst comprises at least one element of GVIB in the zeolite, at least one element of GVIII at the matrix and at least one promoter element (i.e., located mainly at the matrix and deposited on the matrix).

The catalyst of this invention has a very high hydrocracking activity of the hydrocarbon fractions and a greater selectivity than the catalytic formulas that are known in the prior art. Without subscribing to any particular theory, it seems that this particularly high activity of the catalysts of this invention is due to the joint presence of a hydrogenating function on the matrix and a particular hydrogenating function within the porous network of the zeolite, in combination with the presence of a promoter element.

More specifically, a preparation method comprises the following stages:

a) Introduction into the zeolite of at least one element of group VIB and/or group VIII;
b) mixing with the matrix and shaping to obtain the substrate;
c) introduction of at least one promoter element by impregnation and introduction of at least one hydrodehydrogenating element into the matrix or in the substrate by at least one of the following methods:
   addition of at least one compound of said element during the shaping to introduce at least a portion of said element,
   impregnation of the substrate with at least one compound of said element;
d) drying and calcination of the final product that is obtained and optionally drying and/or calcination of the products that are obtained at the end of stages a) or b) or after an impregnation.

The catalyst of this invention can be prepared by all of the methods that are well known to one skilled in the art.

The promoter element is mainly located on the matrix. The silicon promoter element is thus in amorphous form and is located mainly on the matrix.

The silicon that is introduced and that is mainly located on the substrate matrix can be characterized by techniques such as the Castaing microprobe (distribution profile of various elements), the electronic transmission microscopy coupled to an X analysis of the components of the catalysts, or else by the establishment of a cartography for distribution of the elements that are present in the catalyst by electronic microprobe. These local analyses will provide the location of various elements, in particular the location of the amorphous silica on the matrix caused by the introduction of silicon. The location of the silicon of the framework of the zeolite is also revealed. Furthermore, a quantitative estimation of the local contents of silicon and other elements can be made.

In contrast, the NMR of the solid of $^{29}$Si with rotation at the magic angle is a technique that rakes it possible to detect the presence of amorphous silica that is introduced into the catalyst according to the operating procedure that is described in this invention.

Advantageously, the catalyst of this invention is prepared according to the following three stages:

a) Introduction of at least one metal of group VIB and/or at least one metal of group VIII in the zeolite optionally followed by drying and calcination or calcination without prior drying. The drying can be carried out at a temperature of between 60 and 250° C. and the calcination at a temperature of 250 to 800° C.

b) Shaping of the mixture of the zeolite that contains the metal of group VIB and/or the metal of group VIII obtained in stage a) with the oxide matrix to obtain the substrate. One of the preferred methods for shaping in this invention consists in mixing the zeolite in a moist alumina gel for several tens of minutes, then in passing the paste that is thus obtained through a die to form extrudates with a diameter of preferably between 0.4 and 8 mm. The introduction of the elements of group VIB and/or VIII, not including in the zeolite, can take place optionally in this stage by addition of at least one compound of said element so as to introduce at least a portion of said element. This introduction can be accompanied by that of phosphorus, boron, and/or silicon and optionally that of the element of group VIIA (fluorine, for example). The solid that is shaped is then optionally dried at a temperature of between 60 and 250° C. and calcined at a temperature of 250 to 800° C.

c) Introduction of the elements of group VIB and/or VIII, promoter element (such as phosphorus), optional element of GVIIA, by deposition on the substrate (calcined or dried and preferably calcined) that is obtained in stage b), when they have not been introduced completely during stage b). A deposition method that is well known to one skilled in the art is the impregnation of the substrate by a solution that contains the elements of group VIB and/or VIII, and a promoter element (for example phosphorus). The deposition is then optionally followed by drying at a temperature of between 60 and 250° C. and optionally by calcination at a temperature of between 250 to 800° C.

The oxide matrix is usually selected from the group that is formed by the transition aluminas, the silicas and the silica-aluminas and mixtures thereof. It is preferred to use matrices that contain alumina, in all of its forms that are known to one skilled in the art, for example the gamma-alumina.

The preferred zeolite source is the Y zeolite or else the beta zeolite in all of their forms. The zeolite can be in hydrogen form or at least partially exchanged with metallic cations, for example, with cations of alkaline-earth metals and/or cations of rare earth metals of atomic number 57 to 71 inclusive. The zeolite can be at least partly (i.e., more or less) dealuminified as is well known to one skilled in the art.

The element sources of group VIB that can be used are well known to one skilled in the art. For example, among the sources of molybdenum and tungsten, the oxides and the salts of ammonium such as ammonium molybdate, ammonium heptamolybdate and ammonium metatungstate are preferably used.

The element sources of group VIII that can be used are well known to one skilled in the art. For example, nitrates, A sulfates, and halides will be used.

The preferred phosphorus source is orthophosphoric acid $H_3PO_4$, but its salts and esters such as the ammonium phosphates are also suitable. Phosphomolybdic acid and its salts, and phosphotungstic acid and its salts can also advantageously be used. The phosphorus can be introduced, for example, in the form of a mixture of phosphoric acid and a basic organic compound that contains nitrogen, such as ammonia, primary and secondary amines, cyclic amines, compounds of the family of pyridine and quinolines and the compounds of the family of pyrrole.

A number of silicon sources can be used. It is thus possible to use ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. The silicomolybdic acid and its salts, and silicotungstic acid and its salts can also advantageously be used. Silicon can be added by, for example, impregnation of ethyl silicate in solution in a water/alcohol mixture. The silicon can be added by, for example, impregnation of a silicone-type silicon compound that is suspended in water.

The boron source can be boric acid, preferably orthoboric acid $H_3BO_3$, ammonium biborate or pentaborate, boron oxide, boric esters. Boron can be introduced, for example, in the form of a mixture of boric acid, oxidized water and a basic organic compound that contains nitrogen, such as ammonia, primary and secondary amines, cyclic amines, compounds of the family of pyridine and quinolines and the compounds of the family of pyrrole. Boron can be introduced by, for example, a boric acid solution in a water/alcohol mixture.

The sources of elements of group VIIA that can be used are well known to one skilled in the art. For example, the fluoride anions can be introduced in the form of hydrofluoric acid or its salts. These salts are formed with alkaline metals, ammonium or an organic compound. In this latter case, the salt is advantageously formed in the reaction mixture by reaction between the organic compound and the hydrofluoric acid. It is also possible to use hydrolyzable compounds that can release fluoride anions into water, such as ammonium fluorosilicate $(NH_4)_2SiF_6$, silicon tetrafluoride $SiF_4$ or sodium tetrafluoride $Na_2SiF_6$. Fluorine can be introduced by, for example, impregnation of an aqueous solution of hydrofluoric acid or ammonium fluoride.

The hydrogenating function relative to the matrix as it was defined above can therefore be introduced into the catalyst at various levels of the preparation and in various ways. It can be introduced in part only (case, for example, of the combinations of metal oxides of groups VI and VIII) or completely at the time of mixing of the source of alumina and zeolite in stage b), whereby the remainder of the hydrogenating element(s) is then introduced after mixing, and more generally after calcination. The metal of group VIII is preferably introduced simultaneously or after the metal of group VI, regardless of the method of introduction.

The hydrogenating function can also be introduced by one or more ion exchange operations in the calcined substrate (zeolite that is dispersed into the alumina matrix), with solutions that contain the precursor salts of metals that are selected when the latter belong to group VIII. The hydrogenating function (group VIII) is then located both in the porous network of the zeolite and in the matrix. In this case, it is conceivable to limit the amount of metal of group VIII that is introduced into the zeolite before its shaping, even to eliminate this stage.

In this case, the catalyst is prepared by;
a) Optional introduction into the zeolite of at least a portion of at least one element of group VIII,
b) mixing with the matrix and shaping and calcination to obtain the calcined substrate,
c) ionic exchange on the calcined substrate with a solution of at least one compound of group VIII, and introduction of at least one promoter element by impregnation,
d) drying and calcination of the final product that is obtained and optionally drying and/or calcination of the products that are obtained at the end of stage a).

The hydrogenating function relative to the matrix can also be introduced by one or more operations for impregnation of the substrate that is shaped and calcined, by a solution of the precursors of the oxides of metals of group VIII when the precursors of the oxides of metals of group VI were previously introduced at the time of the mixing of the substrate.

The hydrogenating function can finally be introduced by one or more operations for impregnation of the calcined substrate that consists of the zeolite and the alumina matrix that is optionally doped by P, by solutions that contain the precursors of the oxides of metals of groups VI and/or VIII, whereby the precursors of oxides of metals of group VIII are preferably introduced after those of group VI or at the same time as the latter.

In the case where the elements are introduced in several impregnations of the corresponding precursor salts, an intermediate calcination stage of the catalyst should be carried out at a temperature of between 250 and 600° C.

The introduction of phosphorus, boron and/or silicon into the catalyst can be carried out at various levels of the preparation and in various ways. A preferred method according to the invention consists in preparing an aqueous solution of at least one element of group VI and/or at least one element of group VIII and a compound of phosphorus, boron and/or silicon and in initiating a so-called dry impregnation, in which the volume of the pores of the precursors is filled by the solution.

The impregnation of molybdenum and/or tungsten can be facilitated by the addition of phosphoric acid into the solutions, which makes it possible also to introduce phosphorus so as to promote the catalytic activity. Other compounds of the phosphorus can be used as is well known to one skilled in the art.

Phosphorus, boron and/or silicon can be introduced by one or more impregnation operations with excess solution in the calcined precursor.

A preferred method consists in depositing, for example by impregnation, the selected promoter element or elements, for example the boron-silicon pair, on the precursor that may or may not be calcined but is preferably calcined. For this purpose, an aqueous solution is prepared from at least one boron salt such as ammonium biborate or ammonium pentaborate in an alkaline medium and in the presence of oxidized water, and a so-called dry impregnation is initiated in which the volume of the pores of the precursor is filled by the solution that contains boron. In the case where, for example, silicon is also deposited, for example a solution of a silicone-type silicon compound will be used.

The deposition of boron and silicon can also be done simultaneously by using, for example, a solution that contains a boron salt and a silicone-type silicon compound. Thus, for example, it is possible to impregnate by an aqueous solution of ammonium biborate and Rhodorsil E1P silicone of the Rhône-Poulenc Company, to initiate drying at, for example, 80° C., then optionally to impregnate by an ammonium fluoride solution, to initiate drying at, for example, 80° C., and to initiate calcination for example preferably under air in a flushed bed, for example at 500° C. for 4 hours.

The catalysts that are obtained by this invention are shaped in the form of grains of different shapes and sizes. They are generally used in the form of cyclical or multilobar extrudates, such as bilobar, trilobar, multilobar extrudates of straight or twisted shape, but they can optionally be produced and used in the form of crushed powder, tablets, rings, balls, and wheels. They have a specific surface area that is measured by nitrogen adsorption according to the BET method (Brunauer, Emmett, Teller, J. Am. Chem. Soc., Vol. 60, 309–316 (1938)) that is greater than 100 m$^2$/g, a pore volume that is measured by mercury porosimetry of between 0.2 and 1.5 cm$^3$/g and a pore size distribution that can be monomodal, bimodal or polymodal. The catalysts of this invention preferably have a distribution of monomodal pores.

Use for the Transformation of Hydrocarbon Fractions

The catalysts that are thus obtained are generally used for hydrocracking in particular distillate-type hydrocarbon fractions (kerosene, gasoil), vacuum distillates, deasphalted residues or the equivalent, whereby the fractions optionally first can be hydrotreated.

The treated hydrocarbon feedstocks have initial boiling points of at least 150° C., preferably at least 350° C., and more advantageously it is a boiling fraction of between 350 and 620° C.

The hydrocracked fractions with the catalyst of the invention are preferably such that at least 80% by volume corresponds to compounds those boiling points are at least 320° C. and preferably between 350 and 620° C. (i.e., corresponding to compounds that contain at least 15 to 20 carbon atoms). They generally contain heteroatoms such as sulfur and nitrogen. The nitrogen content is usually between 1 and 5000 ppm by weight, and the sulfur content is between 0.01 and 5% by weight.

The hydrocracking conditions such as temperature, pressure, hydrogen recycling rate, hourly volumetric flow rate, can be very variable based on the nature of the feedstock, the quality of the desired products and the installations used by the refiner. The temperature is generally higher than 200° C. and often between 250° C. and 480° C. The pressure is greater than 0.1 MPa and often greater than 1 MPa. The hydrogen recycling rate is at least 50 normal liters of hydrogen per liter of feedstock and often between 80 and 5000 normal liters of hydrogen per liter of feedstock. The hourly volumetric flow rate is generally between 0.1 and 20 volumes of feedstock per volume of catalyst and per hour.

The catalyst of this invention can be used in various cases of the hydrocracking process that link one or more reactors in a series with intermediate separation or otherwise, with recycling of the residue or otherwise.

The catalyst thus can be used, for example, the processes in one stage, with one or more catalysts with or without recycling of gases and liquid or in two stages with one or more catalysts with or without separation between the two reactors with or without recycling of the gases and liquid.

The catalysts of this invention are preferably subjected to a sulfurization treatment that makes it possible to transform, at least in part, the metallic radicals into sulfides before they are brought into contact with the feedstock that is to be treated. This activation treatment by sulfurization is well known to one skilled in the art and can be carried out by any method that is already described in the literature.

A standard sulfurization method that is well known to one skilled in the art consists in heating, in the presence of hydrogen sulfide, to a temperature of between 150 and 800° C., preferably between 250 and 600° C., generally in a flushed-bed reaction zone.

The catalyst of this invention preferably can be used for hydrocracking fractions (such as those of vacuum distillate type) that are high in sulfur and nitrogen and that were previously hydrotreated. In this case, the petroleum fraction conversion process takes place in two stages, whereby the catalyst according to the invention is used in the second stage.

Catalyst 1 of the first stage has a hydrotreatment function and comprises a matrix that preferably has an alumina base and preferably does not contain zeolite, and at least one metal that has a hydrogenating function. Said matrix can also consist of or contain silica, silica-alumina, boron oxide, magnesia, zirconia, titanium oxide or a combination of these oxides. The hydro-dehydrogenating function is ensured by at least one metal or metal compound of group VIII, such as nickel and cobalt in particular. It is possible to use a combination of at least one metal or metal compound of group VI (in particular molybdenum or tungsten) and at least one metal or metal compound of group VIII (in particular cobalt or nickel) of the periodic table. The total concentration of oxides of metals of groups VI and VIII is between 5 and 40% by weight and preferably between 7 and 30% by weight, and the ratio by weight that is expressed in terms of metal oxide of metal (or metals) of group VI to metal (or metals) of group VIII is between 1.25 and 20 and preferably between 2 and 10. In addition, this catalyst can contain phosphorus. The phosphorus content, expressed by concentration of diphosphorus pentaoxide $P_2O_5$, will generally be at most 15%, preferably between 0.1 and 15% by weight and preferably between 0.15 and 10% by weight. It can also contain boron in a B/P ratio=1.02–2 (atomic), whereby the sum of B and P contents expressed in oxides is preferably 5–15% by weight.

The first stage takes place generally at a temperature of 350–460° C., preferably 360–450° C., a pressure of greater than 2 MPa, and preferably greater than 5 MPa, an hourly volumetric flow rate of 0.1–5 h$^{-1}$ and preferably 0.2–2 h$^{-1}$ and with an amount of hydrogen of at least 100 Nl/Nl of feedstock and preferably 260–3000 Nl/Nl of feedstock.

For the conversion stage with the catalyst according to the invention (or second stage), the temperatures are generally greater than or equal to 230° C. and often between 300° C. and 430° C. The pressure is generally greater than 2 MPa and preferably greater than 5 MPa. The amount of hydrogen is at least 100 l/l of hydrogen and often between 200 and 3000 l/l of hydrogen per liter of feedstock. The hourly volumetric flow rate is generally between 0.15 and 10 h$^{-1}$.

Several hydrocracking methods can be used. In a first hydrocracking method, the pressure is moderate. The catalyst according to the invention is then used at a temperature that is generally greater than or equal to 230° C. or 300° C., generally at most 480° C. and often between 350° C. and 450° C. The pressure is generally greater than 2 MPa and less than or equal to 12 MPa. A range of moderate pressure is particularly advantageous that is 7.5–11 MPa, preferably 7.5–10 MPa or else 8–11 MPa and advantageously 8.5–10 MPa. The amount of hydrogen is at least 100 normal liters of hydrogen per liter of feedstock and often between 200 and 3000 normal liters of hydrogen per liter of feedstock. The hourly volumetric flow rate is generally between 0.1 and 10 h$^{-1}$.

In another embodiment, the catalyst of this invention can be used for hydrocracking under high hydrogen pressure conditions of at least 8.5 MPa, preferably at least 9 MPa or at least 10 MPa. The treated fractions are, for example, of vacuum distillate type and are high in sulfur and nitrogen and have been previously hydrotreated. In this case, the petroleum fraction conversion process takes place in two stages, whereby the catalyst according to the invention is used in the second stage.

For the conversion stage with the catalyst according to the invention, the temperatures are generally greater than or equal to 230° C. and often between 300° C. and 430° C. The pressure is generally greater than 8.5 MPa and preferably greater than 10 MPa. The amount of hydrogen is at least 100 l/l of feedstock and often between 200 and 3000 l/l of hydrogen per liter of feedstock. The hourly volumetric flow rate is generally between 0.15 and 10 $h^{-1}$.

Conversion levels that are higher than those obtained in the first method described above then are attained.

Under these conditions, the catalysts of this invention have a better conversion activity and a better selectivity of middle distillates than the commercial catalysts.

The catalyst according to the invention can also be used for hydrorefining (HDS, HDN and hydrogenation of aromatic compounds in particular). The temperature is generally higher than 200° C. and often between 280° C. and 480° C. The pressure is generally higher than 0.1 MPa and often higher than 1 MPa. The presence of hydrogen is generally necessary with a hydrogen recycling rate that is generally at least 80 and often between 100 and 40000 liters of hydrogen per liter of feedstock. The hourly volumetric flow rate is generally between 0.1 and 20 $h^{-1}$.

The following examples illustrate this invention without, however, limiting its scope.

EXAMPLE 1

Production of an Anomalous Catalyst A

Catalyst A is produced in the following way; 20% by weight of a Y zeolite with a crystalline parameter equal to 2.429 nm and an overall Si/Al ratio of 13.6 and an Si/Al framework ratio of 19 is used, that is mixed with 80% by weight of SB3-type alumina that is provided by the Condéa Company. The mixed paste is then extruded through a die with a 1.4 mm diameter. The extrudates are then dried for one night at 120° C. under air then calcined at 550° C. under air. The extrudates are impregnated in the dry state, i.e., by filling the pore volume by an aqueous solution of a mixture of ammonium heptamolybdate, nickel nitrate and orthophosphoric acid, so as to deposit 2.2% by weight of nickel oxide NiO, 12.3% by weight of molybdenum oxide $MoO_3$, 4.4% by weight of phosphorus oxide $P_2O_5$, dried for one night at 120° C. under air and finally calcined under air at 550° C. The final catalyst thus contains 16.2% by weight of a Y zeolite.

EXAMPLE 2

Production of an Anomalous Catalyst B

Catalyst B is produced in the following way: 70% by weight of a Y zeolite with a crystalline parameter that is equal to 2.429 nm and an overall Si/Al ratio of 13.6 and an Si/Al framework ratio of 19 is used, that is mixed with 30% by weight of SB3-type alumina that is provided by the Condéa Company. The mixed paste is then extruded through a die with a 1.4 mm diameter. The extrudates are then dried for one night at 120° C. under air then calcined at 550° C. under air. The extrudates are impregnated in the dry state, i.e., by filling the pore volume by an aqueous solution of a mixture of ammonium heptamolybdate, nickel nitrate and orthophosphoric acid, so as to deposit 1.5% by weight of nickel oxide NiO, 7.3% by weight of molybdenum oxide $MoO_3$, and 2.5% by weight of phosphorus oxide $P_2O_5$. The moist extrudates are then dried for one night at 120° C. under air and finally calcined under air at 550° C. The final catalyst contains 62.1% by weight of a Y zeolite.

EXAMPLE 3

Production of catalysts C and D According to Procedure

Catalysts C and D are produced in the following way: in a first step, a Y zeolite powder with a crystalline parameter that is equal to 2.429 nm and an overall Si/Al ratio of 13.6 and an Si/Al framework ratio of 19 is prepared, that is impregnated by an aqueous solution of ammonium heptamolybdate so as to deposit 2.4% by weight of $Moo_3$ relative to the zeolite. Without prior drying, it is calcined at 500° C. for 2 hours under dry air.

To obtain catalyst C, 20% by weight of the zeolite that is impregnated by molybdenum that is prepared above is used, that is mixed with 80% by weight of SB3-type alumina provided by the Condéa Company. The mixed paste is then extruded through a die with a 1.4 mm diameter. The extrudates are then dried for one night at 120° C. under air then calcined at 550° C. under air. The extrudates are impregnated in the dry state, i.e., by filling the pore volume by an aqueous solution of a mixture of ammonium heptamolybdate, nickel nitrate and orthophosphoric acid, dried for one night at 120° C. under air and finally calcined under air at 550° C. The composition of the solution of impregnation is calculated to obtain on the final catalyst 2.2% by weight of nickel oxide NiO, 12.3% by weight of molybdenum oxide $MoO_3$, 4.4% by weight of phosphorus oxide $P_2O_5$ and 16.2% by weight of a Y zeolite.

To obtain catalyst D, an amount of 70% by weight of the zeolite that is impregnated with molybdenum prepared above with 30% by weight of SB3-type alumina that is provided by the Condéa Company is used. The mixed paste is then extruded through a die with a 1.4 mm diameter. The extrudates are then dried for one night at 120° C. under air then calcined at 550° C. under air. The extrudates are then impregnated in the dry state, i.e., by filling by an aqueous solution of a mixture of ammonium heptamolybdate, nickel nitrate and orthophosphoric acid so as to deposit 1.5% by weight of nickel oxide NiO, 7.3% by weight of molybdenum oxide $MoO_3$, and 2.5% by weight of phosphorus oxide $P_2O_5$. It is dried for one night at 120° C. under air, and finally it is calcined under air at 550° C. In view of the initial presence of molybdenum in the zeolite, the catalyst contains by weight of oxide: 1.5% by weight of nickel oxide NiO, 7.3% by weight of molybdenum oxide $MoO_3$, and 2.5% by weight of phosphorus oxide $P_2O_5$. The final catalyst contains 60.4% by weight of the Y zeolite.

EXAMPLE 4

Analyses of Catalysts

Two catalysts A and C that contain only about 16% of zeolite were analyzed to show the presence or otherwise of molybdenum in the zeolite. Showing the presence of molybdenum in the zeolite while the hydrogenating phase that is deposited on the oxide matrix, the alumina here, contains a lot of molybdenum is actually the more difficult case in particular for the high zeolite contents.

The first method that is used is the electronic transmission microscopy equipped with an X energy dispersion spectrometer that allows the identification and the quantification of elements that are present in the crystals of the zeolite.

For this purpose, an electronic transmission microscope, JEOL 2010R URP, equipped with an X TRACOR energy dispersion spectrometer that is itself equipped with a Z-MAX30 detector is used. The extrudates of catalysts are finely ground in a mortar. The powder is included in the resin to produce ultrafine fractions with a thickness of 700 Å for the two catalysts. The fractions that are produced are collected on a Cu grid that is covered with a membrane C with holes that is used as a substrate in the preparation. These preparations are dried under an infra-red lamp before being introduced into the electronic transmission microscope where they will be subjected to a primary vacuum that lasts for several minutes then to a secondary vacuum that lasts throughout the observation. The electronic microscope makes it possible to perfectly identify the zeolite crystals of a size of about 0.4 micron dispersed in the alumina matrix. A certain number of local analyses (15 to 20) performed on various matrix zones and on various zeolite crystals with a probe beam with a diameter of 0.1 micron are then initiated. The quantitative treatment of the signal makes it possible to obtain the relative concentration in atomic % of the elements (without oxygen).

Table 1 summarizes the results that are obtained for samples A and C that are described in the examples above.

TABLE 1

| Catalyst | Analyzed Zone | Si % at. | Al % at. | Ni % at. | Mo. % at. | Si/Al at./at. | Ni/Mo at./at. |
|---|---|---|---|---|---|---|---|
| A | Zeolite | 93 | 6.8 | 0.05 | 0 | 14.8 | — |
| A | Alumina | 1.6 | 91.4 | 2 | 4.9 | 0 | 0.4 |
| C | Zeolite | 92.5 | 6.1 | 0.05 | 0.8 | 16.6 | 0.06 |
| C | Alumina | 0.3 | 88.9 | 3.7 | 7.1 | 0 | 0.5 |

It is observed in Table 1 that catalyst A contains Y zeolite crystals without molybdenum. The amount of Ni that is detected is indicative of the inaccuracy of the measurement. In contrast, in catalyst C, this analysis technique makes it possible to detect unambiguously the presence of molybdenum in the Y zeolite crystals.

The second technique that is used is the electronic microprobe. Some extrudates are coated with resin then polished out to their diameter and metallized with carbon. The sample is introduced into a JXM 880 device to analyze the local composition of Al, Si, Mo and Ni at different points.

Whereby the resolution is on the order of several cubic microns, each zone that is analyzed contains either zeolite alone or alumina alone, or a mixture of the two phases.

To better demonstrate the presence of molybdenum in the Y zeolite in the case of sample C, the following calculations are initiated. For each point of analysis, the concentration, expressed in % by weight of oxide of Al, Si, Mo and Ni, is measured. Starting from the concentration of oxide of Al and Si and an Si/Al atomic ratio of the zeolite, the $Al_2O_3/(Y$ zeolite$+Al_2O_3$) mass ratio is derived at each point. It is then possible to establish a diagram that connects the Mo concentration that is measured based on the $Al_2O_3/(Y$ zeolite$+Al_2O_3$) mass ratio. For catalyst A, the measuring points that do not contain zeolite and therefore for which $Al_2O_3/(Y$ zeolite$+Al_2O_3$)=1 should contain about 14 to 18% by weight of $MoO_3$. Conversely, the measuring points that do not contain the matrix and therefore for which $Al_2O_3/(Y$ zeolite$+Al_2O_3$)=0 should not contain $MoO_3$. By grouping all of the intermediate measurements that correspond to mixtures on this type of graph, a linear relationship is obtained between Mo concentration and the $Al_2O_3/(Y$ zeolite$+Al_2O_3$) ratio that passes through zero as FIG. 1 clearly shows. For catalyst C, the measuring points that do not contain the matrix and therefore for which $Al_2O_3/(Y$ zeolite$+Al_2O_3$)=0 should contain $MoO_3$. This provides a linear relationship between Moo concentration and the $Al_2O_3/(Y$ zeolite$+Al_2O_3$) ratio that passes through the mean value of the $MoO_3$ concentration in the zeolite as FIG. 2 clearly shows it.

Figure 2:
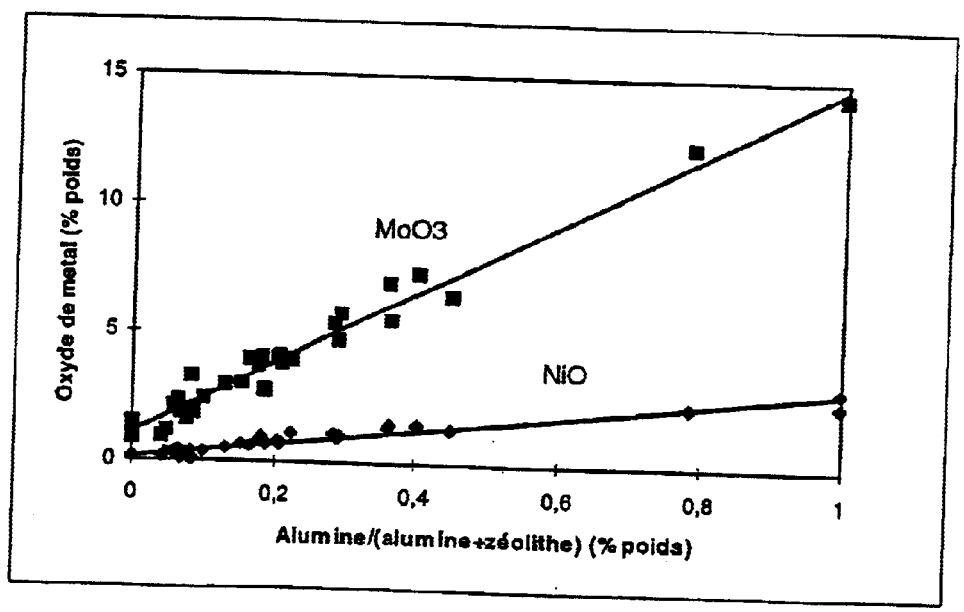

The comparison of FIG. 1 and FIG. 2 clearly shows that the ordinate at the origin that indicates the $MoO_3$ concentration of the analyzed catalyst is zero for catalyst A (no Mo in the Y) and about 1.1% in the case of catalyst C (about 1.1% of Mo in the Y). It is noted in FIGS. 1 and 2 that the same procedure can be applied for nickel and that in the two cases, the ordinate at the origin indicates the absence of nickel in the zeolite which is clearly the case for catalysts A and C that are exemplified above.

EXAMPLE 5

Comparison of Catalysts for Hydrocracking of a Vacuum Distillate with Moderate Pressure.

The catalysts whose preparations are described in the examples above are used under the conditions of hydrocracking at moderate pressure on a petroleum feedstock whose main characteristics are as follows:

| | |
|---|---|
| Starting point | 365° C. |
| 10% point | 430° C. |
| 50% point | 472° C. |
| 90% point | 504° C. |
| Final point | 539° C. |
| Pour point | +39° C. |
| Density (20/4) | 0.921 |
| Sulfur (% by weight) | 2.38 |
| Nitrogen (ppm by weight) | 1130 |

The catalytic test unit comprises two fixed-bed reactors with upward circulation of the feedstock ("up-flow"). 40 ml of catalyst is introduced into each of the reactors. In the first reactor, the one in which the feedstock passes first, the HTH548 hydrotreatment first-stage catalyst that is sold by the Procatalyse Company and that comprises an element of group VI and an element of group VIII that are deposited on alumina is introduced. In the second reactor, the one in which the feedstock passes last, the hydrocracking catalyst (A, B, C or D) is introduced. The two reactors undergo an in-situ sulfurization stage before reaction. We note that any in-situ or ex-situ sulfurization method is suitable. Once the sulfurization is carried out, the feedstock that is described above can be transformed. The total pressure is 8.5 MPa, the hydrogen flow rate is 500 liters of gaseous hydrogen per liter of injected feedstock, the hourly volumetric flow rate is 0.8 $h^{-1}$. The two reactors operate at the same temperature.

The catalytic performances are expressed in terms of gross conversion at 400° C. (CB), by coarse selectivity (SB) and by hydrodesulfurization conversions (HDS) and hydrodenitrating conversions (HDN). These catalytic performances are measured in the catalyst after a stabilization period, generally at least 48 hours, has elapsed.

Gross conversion CB is assumed to be equal to:

$$CB = \text{\% by weight of } 380° C.^{Less} \text{ of the effluent}$$

Coarse selectivity SB is assumed to be equal to:

$$SB100 \text{*weight of the fraction } (150° C.-380° C.)/\text{weight of the fraction } 380° C.^{Less} \text{ of the effluent}$$

Hydrodesulfurization conversion HDS is assumed to be equal to:

$$HDS = (S_{initial} - S_{effluent})/S_{initial} * 100 = (24600 - S_{effluent})/24600 * 100$$

Hydrodenitrating conversion HDN is assumed to be equal to:

$$HDN=(N_{initial}-N_{effluent})/N_{initial}*100=(1130-N_{effluent})/1130*100$$

In the following table, we recorded the characteristics of the catalysts and their performances: gross conversion CB at 400° C., coarse selectivity SB, hydrodesulfurization conversion HDS and hydrodenitrating conversion HDN for the four catalysts.

|  | A | B | C | D |
|---|---|---|---|---|
| Zeolite (%) | 16.2 | 62.1 | 16.2 | 60.4 |
| Nio (%) | 2.2 | 1.5 | 2.2 | 1.5 |
| MoO3 (%) | 12.3 | 7.3 | 12.3 | 7.3 |
| P2O5 (%) | 4.4 | 2.5 | 4.4 | 2.5 |
| MoO3 in zeolite (% by weight in zeolite) | 0 | 0 | 2.4 | 2.4 |
| CB (% by weight) | 48.7 | 54.8 | 49.3 | 56.9 |
| SB | 80.3 | 72.6 | 82.0 | 79.9 |
| HDS (%) | 99.4 | 96.3 | 99.6 | 99.7 |
| HDN (%) | 96.6 | 87.1 | 97.8 | 98.9 |

The comparison of catalyst C with catalyst A that contains the same amount of Y zeolite, oxide matrix, hydro-dehydrogenating elements and phosphorus shows that the presence of a hydrogenating phase that is contained in the porous network of the zeolite provides a better conversion level of the fraction 380° $C.^{plus}$ than catalyst A that does not contain it. The selectivity is the same level whereas the HDS and HDN activities are slightly increased. In the case of catalysts B and D that contain a large amount of zeolite, a very clear improvement of the conversion, the selectivity and the HDS and HDN activities are noted when a hydrogenating function is present in the porous network of the zeolite. In addition, it is observed that by comparing catalyst A and catalyst D, an equivalent selectivity, i.e., a good selectivity, is obtained with catalyst D, while the conversion was very considerably increased. Furthermore, catalysts C and D that contain Mo in the porous network have the advantage of providing better performances in hydrotreatment (hydrodesulfurization and hydrodenitrating).

EXAMPLE 6

Comparison of the Catalysts of Hydrocracking of a Vacuum Distillate with Higher Pressure The catalysts whose preparations are described in the examples above are used under conditions of hydrocracking at high pressure (12 MPa) on a petroleum feedstock whose main characteristics are as follows:

| Starting point | 277° C. |
|---|---|
| 10% point | 381° C. |
| 50% point | 482° C. |
| 90% point | 531° C. |
| Final point | 545° C. |
| Pour point | +36° C. |
| Density (20/4) | 0.919 |
| Sulfur (% by weight) | 2.46 |
| Nitrogen (ppm by weight) | 930 |

The catalytic test unit comprises two fixed-bed reactors with upward circulation of the feedstock ("up-flow"). 40 ml of catalyst is introduced into each of the reactors. In the first reactor, the one in which the feedstock passes first, the HR360 hydrotreatment first-stage catalyst "1" that is sold by the Procatalyse Company and that comprises an element of group VI and an element of group VIII that are deposited on alumina is introduced. In the second reactor, the one in which the feedstock passes last, catalyst "2" of the second stage, i.e., the hydroconversion catalyst, is introduced. The two catalysts undergo an in-situ sulfurization stage before reaction. We note that any in-situ or ex-situ sulfurization method is suitable. Once the sulfurization is carried out, the feedstock that is described above can be transformed. The total pressure is 12 MPa, the hydrogen flow rate is 1000 liters of gaseous hydrogen per liter of injected feedstock, and the overall hourly volumetric flow rate is 0.9 h$^-$. The temperature of the first reactor is 390° C.

The catalytic performances are expressed by the temperature that makes it possible to reach a gross conversion level of 70% and by the coarse selectivity. These catalytic performances are measured in the catalyst after a stabilization period, generally at least 48 hours, has elapsed.

Gross conversion CB is assumed to be equal to:

CB=% by weight of 380° $C.^{Less}$ of the effluent

Coarse selectivity SB is assumed to be equal to:

SB=100*weight of the fraction (150° C.–380° C.)/weight of the fraction 380° $C.^{Less}$ of the effluent The reaction temperature of the second reactor that contains the hydroconversion catalyst (A, B, C or D) is set to reach a gross conversion CB that is equal to 70% by weight. In the following table, we recorded the reaction temperature and the coarse selectivity for the four catalysts A, B, C and D.

|  | T (° C.) for 70% Gross Conversion | SB |
|---|---|---|
| A | 386 | 65 |
| B | 366 | 43 |
| C | 384 | 67 |
| D | 365 | 64 |

The use of catalyst B that contains a large amount of the Y zeolite relative to catalyst A shows that by increasing the amount of zeolite, the activity of the catalyst that is indicated by the temperature level that is required to obtain 70% of conversion of the feedstock is considerably increased but leads to a very significant loss of selectivity. The presence of a hydrogenating phase inside the porous network of the zeolite, obtained with samples C and D, show that the very good level of selectivity of catalyst A is maintained. Sample D has a much better activity than catalyst C due to the presence of a strong zeolite content. The addition of a metal of group VIB within the porous network of the zeolite is therefore particularly advantageous for obtaining very active and very selective hydrocracking catalysts in middle distillates.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French Application 99/08.180, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

CROSS-REFERENCE TO RELATED APPLICATION

This application is related to Applicants' concurrently filed application Attorney Docket No. PET 1867, entitled "CATALYSEUR CONTENANT UNE ZEOLITHE CHARGEE EN ELEMENT DU GROUP VB ET SON UTILISATION EN HYDRORAFFINAGE ET HYDROCRAQUAGE DE COUPES HYDROCARBONEES," based on French Application 99/08.177 filed Jun. 25, 1999.

[key to FIGS. 1 and 2:]

Oxyde de metal (% poids)=Metal oxide (% by weight)

Alumine/(alumine+zéolithe) (% poids)=alumina/(alumina+zeolite) (% by weight)

What is claimed is:

1. A catalyst comprising at least one oxide matrix, at least one zeolite having a porous network and at least one hydro-dehydrogenating element located on the matrix and selected from the group consisting of elements of groups VIB and VIII, wherein the zeolite contains in said porous network at least one element of group VIB, the catalyst also comprising at least one promoter element selected from the group consisting of boron, silicon, and phosphorous.

2. A catalyst according to claim 1, wherein the zeolite is a Y zeolite or a beta zeolite.

3. A catalyst according to claim 1, wherein the zeolite is at least in part dealuminated.

4. A catalyst according to claim 1, further comprising at least one element of group VII A.

5. A catalyst according to claim 1, wherein at least one element of group VIB and at least one element of group VIII are deposited on the catalyst.

6. A catalyst according to claim 1, in which the matrix is selected from the group consisting of alumina, silica and silica-alumina.

7. A catalyst according to claim 1, containing both that contains boron and silicon.

8. A catalyst according to claim 1, comprising alumina, a Y zeolite containing in the porous network thereof molybdenum, and deposited on the alumina nickel, molybdenum and phosphorus.

9. A catalyst according to claim 1, subjected to sulfurization so as to convert at least partly the metallic components into sulfides.

10. A catalyst according to claim 1, wherein the zeolite further contains in said porous network the at least one element of group VIII.

11. A catalyst according to claim 10, containing in % by weight:

0.1 to 98.7% of zeolite, 1 to 99.7% of matrix, at least one of the elements of groups VIB and/or VIII at a concentration of 0.1–40% of an element of group VIB, and/or 0.1 to 30% of an element of group VIII (% by weight of oxide), at most 20% (% by weight of oxide) of at least one promoter element that is selected from the group consisting of boron, silicon and phosphorus, 0–20% of at least one element of group VIIA, and in which the zeolite contains in its porous network (in % by weight of oxide in the catalyst) at least one of the elements of groups VIB and/or VIII at a concentration of 0.1–10% by weight of an element of group VIB and/or 0.1–10% by weight of an element of group VIII.

12. A catalyst according to claim 11, comprising 0.1–20% of at least one promoter element.

13. A catalyst according to claim 10, prepared by:
a) introducing into the zeolite at least one element of group VIB and/or group VIII;
b) mixing the zeolite with the matrix and shaping the resultant mixture to obtain the substrate, and
c) introducing at least one promoter element by impregnation and introducing at least one hydro-dehydrogenating element in the matrix or on the substrate by at least one of the following methods so as to obtain a final product:
adding at least one compound of said hydro-dehydrogenating element during the shaping to introduce at least a portion of said element,
impregnation of the substrate with at least one compound of said hydro-dehydrogenating element;
d) drying and calcining the final product and optionally drying and/or calcining intermediate products obtained at the end of stages a) or b) or after the impregnation (c).

14. A catalyst according to claim 13, prepared by:
a) optionally introducing into the zeolite at least a portion of at least one element of group VIII,
b) mixing the zeolite with the matrix and shaping and calcining the resultant mixture to obtain a calcined substrate,
c) subjecting the calcined substrate to ion exchange with a solution of at least one compound of group VIII, and impregnating said calcined substrate with at least one promoter element to obtain a final product,
d) drying and calcining the final product and optionally drying and/or calcining of intermediate products obtained at the end of stage a).

15. A catalyst according to claim 10, wherein the at least one promoter element is deposited on the matrix.

16. A catalyst according to claim 10, wherein the at least one element of group VIB is molybdenum and the at least one promoter is deposited on the matrix.

17. A catalyst according to claim 10, wherein the at least one element of group VIB comprises molybdenum, the at least one element group VIII comprises nickel, the at least one element zeolite comprises Y zeolite, the at least one oxide matrix comprises alumina, and the at least one promoter element comprises phosphorus.

18. A catalyst according to claim 1, wherein the at least element of group VIB is molybdenum.

19. A catalyst according to claim 1, wherein the at least one promoter element is deposited on the matrix.

20. In a process comprising catalytically converting a hydrocarbon fraction, the improvement wherein the catalyst is the catalyst of claim 1.

21. A process according to claim 20 for hydrocracking or hydrorefining.

22. A process according to claim 21, for hydrocracking in which the temperature is at least 230° C., the pressure is greater than 2 MPa and less than or equal to 12 MPa, the amount of hydrogen is at least 100 normal liters per liter of feedstock, and the hourly volumetric flow rate is 0.1–10 h−1.

23. A process according to claim 22, in which the pressure is 7.5 to 11 MPa.

24. A process according to claim 21 for hydrocracking in which the pressure is at least 8.5 MPa, in which the temperature is at least 230° C., the amount of hydrogen is at least 100 normal liters per liter of feedstock, and the hourly volumetric flow rate is 0.15–10 h−1.

* * * * *